(12) United States Patent
Luo et al.

(10) Patent No.: US 8,976,729 B2
(45) Date of Patent: Mar. 10, 2015

(54) MAXIMUM POWER SPECTRAL DENSITY REPORTING IN RESPONSE TO OVERLOAD INDICATIONS

(75) Inventors: Tao Luo, San Diego, CA (US); Aleksandar Damnjanovic, Del Mar, CA (US); Durga Prasad Malladi, San Diego, CA (US); Yongbin Wei, San Diego, CA (US); Peter A. Barany, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 12/857,243

(22) Filed: Aug. 16, 2010

(65) Prior Publication Data

US 2011/0044247 A1 Feb. 24, 2011

Related U.S. Application Data

(60) Provisional application No. 61/235,292, filed on Aug. 19, 2009.

(51) Int. Cl.
*H04W 52/14* (2009.01)
*H04W 52/24* (2009.01)
(Continued)

(52) U.S. Cl.
CPC .......... *H04W 52/146* (2013.01); *H04W 52/243* (2013.01); *H04W 52/367* (2013.01);
(Continued)

(58) Field of Classification Search
CPC ............ H04W 52/146; H04W 52/243; H04W 52/367; H04W 52/40; H04W 28/02; H04L 1/0031; H04L 1/1607; H04L 5/0053; H04L 5/0073

USPC ............ 370/328; 455/39, 501, 507, 517, 522
See application file for complete search history.

(56) References Cited

U.S. PATENT DOCUMENTS 6,807,154 B1 10/2004 Malmgren et al.
2008/0214197 A1* 9/2008 Englund et al. ............... 455/450
(Continued)

FOREIGN PATENT DOCUMENTS

CN 101288324 A 10/2008
WO WO2007024931 A2 3/2007
(Continued)

OTHER PUBLICATIONS

3rd Generation Partnership Project; Technical Specification Group Radio Access Network; Evolved Universal Terrestrial Radio Access (E-UTRA); Physical layer procedures (Release 8) 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V8.7.0, May 1, 2009, pp. 1-81, XP050377562 the whole document.
(Continued)

*Primary Examiner* — Paul H Masur
(74) *Attorney, Agent, or Firm* — Ashish L. Patel

(57) ABSTRACT

Certain aspects of the present disclosure propose methods for reporting information such as a maximum power spectral density to a serving access point after receiving overload indicators from one or more neighboring access points. The reported information may be multiplexed with other information (e.g., Channel Quality Indicator (CQI), Precoding Matrix Index (PMI), rank indication (RI) or acknowledgement (ACK)/negative acknowledgment (NACK) message for downlink data channel) before transmission to the serving access point. In addition, the information may be transmitted in a medium access control (MAC) packet data unit (PDU).

47 Claims, 5 Drawing Sheets

(51) Int. Cl.
*H04W 52/36* (2009.01)
*H04W 52/40* (2009.01)
*H04L 1/00* (2006.01)
*H04L 5/00* (2006.01)
*H04L 1/16* (2006.01)

(52) U.S. Cl.
CPC .............. *H04W52/40* (2013.01); *H04L 1/0031* (2013.01); *H04L 5/0073* (2013.01); *H04L 1/1607* (2013.01); *H04L 5/0053* (2013.01)
USPC .......................................... 370/328; 455/522

(56) References Cited

U.S. PATENT DOCUMENTS

| | | | |
|---|---|---|---|
| 2008/0220806 A1* | 9/2008 | Shin et al. | 455/522 |
| 2008/0233967 A1* | 9/2008 | Montojo et al. | 455/452.2 |
| 2008/0247375 A1* | 10/2008 | Muharemovic et al. | 370/344 |
| 2009/0179755 A1* | 7/2009 | Bachl et al. | 340/540 |
| 2010/0041428 A1* | 2/2010 | Chen et al. | 455/522 |
| 2010/0056061 A1* | 3/2010 | Luo et al. | 455/63.1 |
| 2010/0234061 A1* | 9/2010 | Khandekar et al. | 455/522 |
| 2010/0238885 A1* | 9/2010 | Borran et al. | 370/329 |
| 2010/0246463 A1* | 9/2010 | Papasakellariou et al. | 370/311 |
| 2011/0039589 A1* | 2/2011 | Skov | 455/501 |
| 2012/0087276 A1* | 4/2012 | Huang et al. | 370/253 |

FOREIGN PATENT DOCUMENTS

| | | |
|---|---|---|
| WO | WO2008055247 A1 | 5/2008 |
| WO | WO2008067471 | 6/2008 |

OTHER PUBLICATIONS

International Search Report and Written Opinion -PCT/US2010/045818, International Search Authority—European Patent Office—Mar. 7, 2011.

Lucent Technologies: "Uplink Scheduling With Inter—cell Interference Control" 36PP Draft; R2-062814, SRD Generation Partnership Project (3GPP), Mobile Competence Centre ; 650, Route Des Lucioles ; F-06921 Sophia-Antipolis Cedex ; France, vol. RAN WG2, no. Seoul, Korea; 20061005, Oct. 5, 2006 XP050132339.

3GPP TR 25.814 V7.1.0, Technical Report, 3rd Generation Partnership Project, Technical Specification Group Radio Access Network, Physical layer aspects for evolved Universal Terrestrial Radio Access (UTRA) (Release 7), 3GPP TR 25.814 V7.1.0, [Online] vol. 25.814, No. V7.1.0, Sep. 1, 2006, pp. 1-25, XP002511692, Retrieved from the Internet, URL: http,//www.3gpp.org/ftp/Specs/archive/25_series/25.814/25814-710.zip>.

Qualcomm Europe, "UL Interference Control in the Absence of X2 for Rel 9", 3GPP Draft, R1-091442 ICIC With No X2, 3rd Generation Partnership Project (3GPP), Mobile Competence Centre, 650, Route Des Lucioles, F-06921 Sophia-Antipolis Cedex, France, no. Seoul, Korea, 20090318, Mar. 18, 2009, XP050339016.

Taiwan Search Report—TW099127603—TIPO—Mar. 25, 2013.

\* cited by examiner

MAXIMUM POWER SPECTRAL DENSITY REPORTING IN RESPONSE TO OVERLOAD INDICATIONS

CLAIM OF PRIORITY UNDER 35 U.S.C. §119

The present Application for patent claims priority to U.S. Provisional Application No. 61/235,292, entitled, "Maximum Power Spectral Density Reporting to Overload Indications," filed Aug. 19, 2009, and assigned to the assignee hereof and hereby expressly incorporated by reference herein.

BACKGROUND

1. Field of the Invention

The present disclosure relates generally to communication, and more specifically for inter-cell interference coordination in a wireless communication network.

2. Background

The 3rd Generation Partnership Project (3GPP) Long Term Evolution (LTE) represents a major advance in cellular technology and is the next step forward in cellular 3G services as a natural evolution of Global System for Mobile Communications (GSM) and Universal Mobile Telecommunications System (UMTS). The LTE provides for an uplink speed of up to 50 megabits per second (Mbps) and a downlink speed of up to 100 Mbps and brings many technical benefits to cellular networks. The LTE is designed to meet carrier needs for high-speed data and media transport as well as high-capacity voice support well into this decade. Bandwidth is scalable from 1.25 MHz to 20 MHz. This suits the needs of different network operators that have different bandwidth allocations, and also allows operators to provide different services based on spectrum. The LTE is also expected to improve spectral efficiency in 3G networks, allowing carriers to provide more data and voice services over a given bandwidth. The LTE encompasses high-speed data, multimedia unicast and multimedia broadcast services.

Physical layer (PHY) of the LTE standard is a highly efficient means of conveying both data and control information between an enhanced base station (eNodeB) and mobile user equipment (UE). The LTE PHY employs advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier-Frequency Division Multiple Access (SC-FDMA) on the uplink (UL). OFDMA allows data to be directed to or from multiple users on a subcarrier-by-subcarrier basis for a specified number of symbol periods.

The LTE-Advanced is an evolving mobile communication standard for providing 4G services. Being defined as 3G technology, the LTE does not meet the requirements for 4G also called International Mobile Telecommunications-Advanced (IMT-Advanced) as defined by the International Telecommunication Union such as peak data rates up to 1 Gbit/s. Besides the peak data rate, the LTE-Advanced also targets faster switching between power states and improved performance at the cell edge.

SUMMARY

Certain aspects of the present disclosure provide a method for wireless communications. The method generally includes receiving one or more interference overload indicator messages from one or more neighboring access points, calculating, based on information in the overload indicator messages, information to report for one or more subcarriers, and multiplexing the calculated information with other information reported to a serving access point.

Certain aspects of the present disclosure provide a method for wireless communications. The method generally includes receiving information from a user equipment in response to an overload indicator message, wherein the information is multiplexed with other reported information, and performing inter-cell interference coordination (ICIC) based on the received information.

Certain aspects of the present disclosure provide an apparatus for wireless communications. The apparatus generally includes logic for receiving one or more interference overload indicator messages from one or more neighboring access points, logic for calculating, based on information in the overload indicator messages, information to report for one or more subcarriers, and logic for multiplexing the calculated information with other information reported to a serving access point.

Certain aspects of the present disclosure provide an apparatus for wireless communications. The apparatus generally includes logic for receiving information from a user equipment in response to an overload indicator message, wherein the information is multiplexed with other reported information, and logic for performing inter-cell interference coordination (ICIC) based on the received information.

Certain aspects of the present disclosure provide an apparatus for wireless communications. The apparatus generally includes means for receiving one or more interference overload indicator messages from one or more neighboring access points, means for calculating, based on information in the overload indicator messages, information to report for one or more subcarriers, and means for multiplexing the calculated information with other information reported to a serving access point.

Certain aspects of the present disclosure provide an apparatus for wireless communications. The apparatus generally includes means for receiving information from a user equipment in response to an overload indicator message, wherein the information is multiplexed with other reported information, and means for performing inter-cell interference coordination (ICIC) based on the received information.

Certain aspects provide a computer-program product for wireless communications, comprising a computer-readable medium having instructions stored thereon, the instructions being executable by one or more processors. The instructions generally include instructions for receiving one or more interference overload indicator messages from one or more neighboring access points, instructions for calculating, based on information in the overload indicator messages, information to report for one or more subcarriers, and instructions for multiplexing the calculated information with other information reported to a serving access point.

Certain aspects provide a computer-program product for wireless communications, comprising a computer-readable medium having instructions stored thereon, the instructions being executable by one or more processors. The instructions generally include instructions for receiving information from a user equipment in response to an overload indicator message, wherein the information is multiplexed with other reported information, and instructions for performing inter-cell interference coordination (ICIC) based on the received information.

Certain aspects of the present disclosure provide an apparatus for wireless communications. The apparatus generally includes at least one processor configured to receive one or more interference overload indicator messages from one or more neighboring access points, calculate, based on information in the overload indicator messages, information to report for one or more subcarriers, and multiplex the calculated information with other information reported to a serving access point.

Certain aspects of the present disclosure provide an apparatus for wireless communications. The apparatus generally includes at least one processor configured to receive information from a user equipment in response to an overload indicator message, wherein the information is multiplexed with other reported information, and perform inter-cell interference coordination (ICIC) based on the received information.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
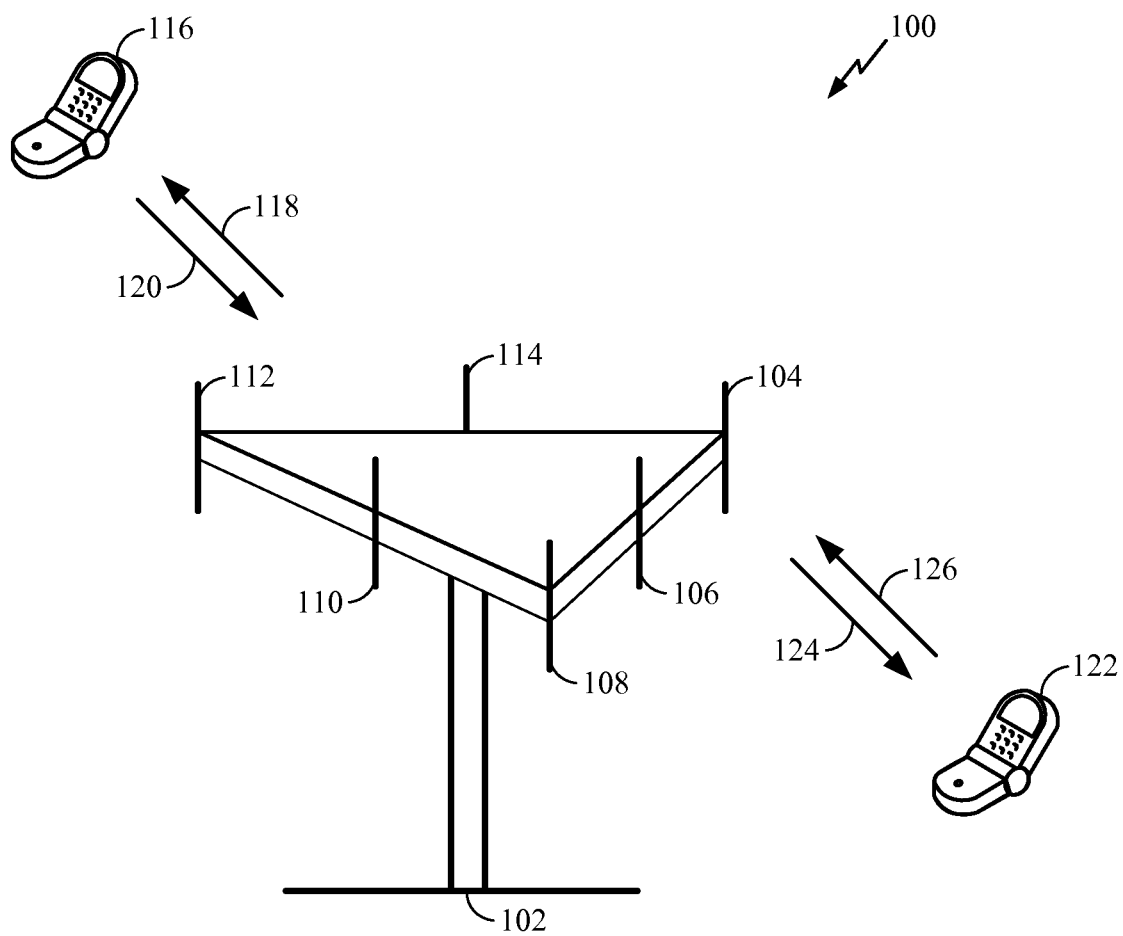
FIG. 1 illustrates a multiple access wireless communication system, in accordance with certain aspects of the present disclosure.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An access point 102 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a Frequency Division Duplex (FDD) system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
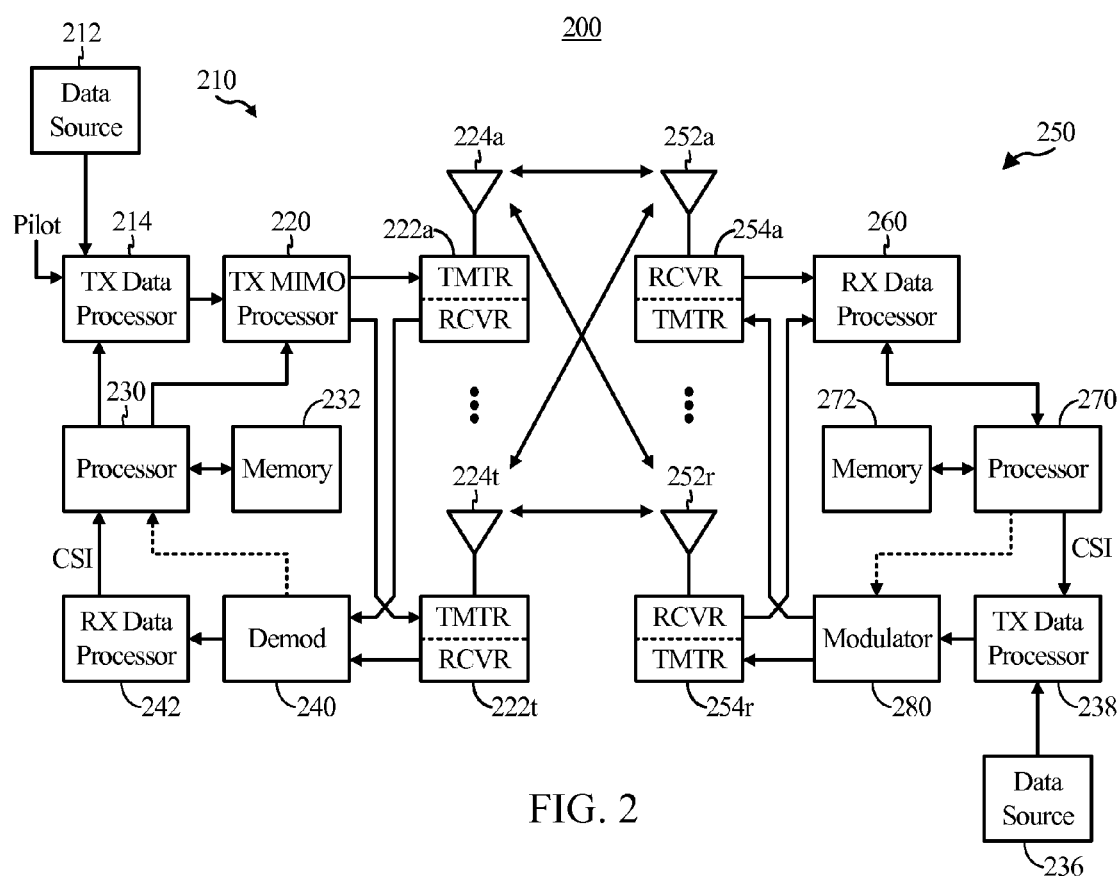
FIG. 2 illustrates a block diagram of multiple input multiple output (MIMO) communication system, in accordance with certain aspects of the present disclosure.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion. A memory unit 272 is coupled to the processor 270.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights then processes the extracted message.

Figure 3:
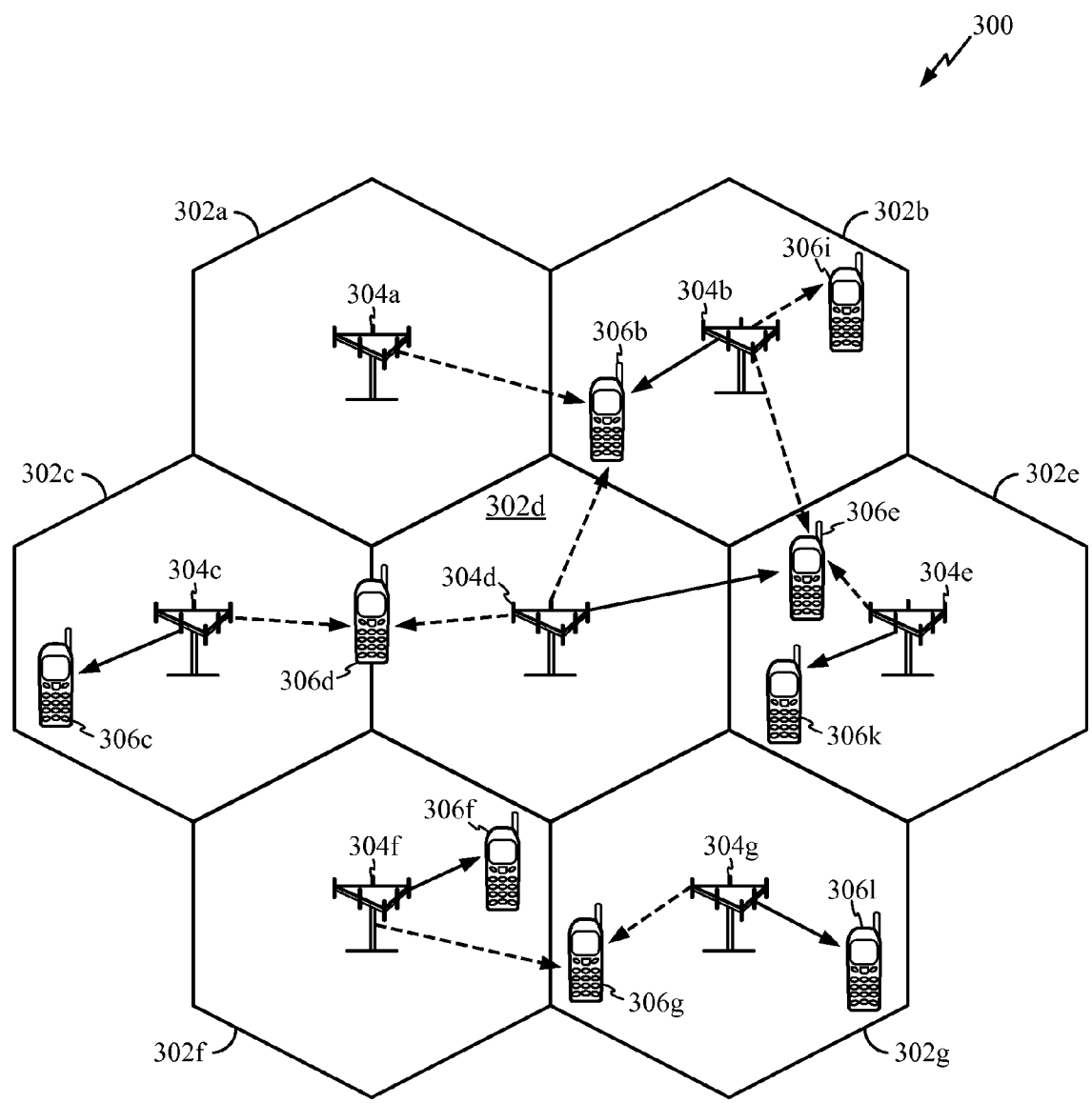
FIG. 3 illustrates an example wireless communication system, in accordance with certain aspects of the present disclosure.

FIG. 3 illustrates an example wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g., to serve one or more frequencies). Various access terminals (ATs) 306, including ATs 306a-306k, also known interchangeably as user equipment (UE) or mobile stations, are dispersed throughout the system.

Each UE 306 may communicate with one or more APs 304 on a forward link (FL) and/or a reverse link (RL) at a given moment, depending upon whether the UE is active and whether it is in soft handoff, for example. The wireless communication system 300 may provide service over a large geographic region, for example, macro cells 302a-302g may cover a few blocks in a neighborhood.

MAXIMUM POWER SPECTRAL DENSITY REPORTING IN RESPONSE TO OVERLOAD INDICATIONS

Certain aspects of the present disclosure propose methods for reporting information such as a maximum power spectral density to a serving access point after receiving overload indicators from one or more neighboring access points. The reported information may be multiplexed with other information (e.g., Channel Quality Indicator (CQI), Precoding Matrix Index (PMI), a ranking indication (RI) or acknowledgement (ACK)/negative acknowledgment (NACK) message for downlink data channel) before transmission to the serving access point. In addition, the information may be transmitted in a medium access control (MAC) packet data unit (PDU).

The LTE standard provides intra-cell orthogonality between user equipments (UEs) in both uplink and downlink; therefore, there is no interference between transmissions within the same cell but only interference between cells. Uplink power control is used to reduce the inter-cell interference and improve the performance especially for the UEs at the edge of the cell.

Inter-cell interference coordination (ICIC) is a scheduling strategy for limiting the interference among cells. In dynamic ICIC, cell-edge UEs in different neighboring cells are scheduled on complementary parts of the spectrum to reduce the interference. Metrics such as a high-interference indicator (HII) or an overload indicator (OI) may be exchanged between cells (i.e., access points, eNodeBs) through a backhaul network.

The high-interference indicator (HII) may provide information to neighboring APs about the part of the cell bandwidth upon which the AP intends to schedule its cell-edge UEs. Because cell-edge UEs are susceptible to inter-cell interference, upon receiving the high-interference indicator, an AP may avoid scheduling UEs close to the AP that issued the high-interference indicator on this part of the bandwidth.

The overload indicator (OI) may provide information on the uplink interference level experienced in each part of the cell bandwidth. When an AP receives the overload indicator for some resource blocks, it may reduce the interference generated on these resource blocks by adjusting its scheduling strategy, for example, by using a different set of resources, therefore improving the interference situation for the neighbor cell that issued the overload indicator.

Inter-cell-interference coordination schemes may result in full frequency-reuse in neighboring cells. Both uplink and downlink ICIC strategies may benefit from knowledge about the radio-wise position of a UE relative to neighboring cells. Such knowledge may be obtained from the UEs that may be measuring the signal strength from different cells.

For certain aspects, an access point may transmit overload indicators to one or more UEs that are served by neighboring access points. The UEs may respond to the OIs by reporting power spectral density values to their serving access points.

Figure 4:
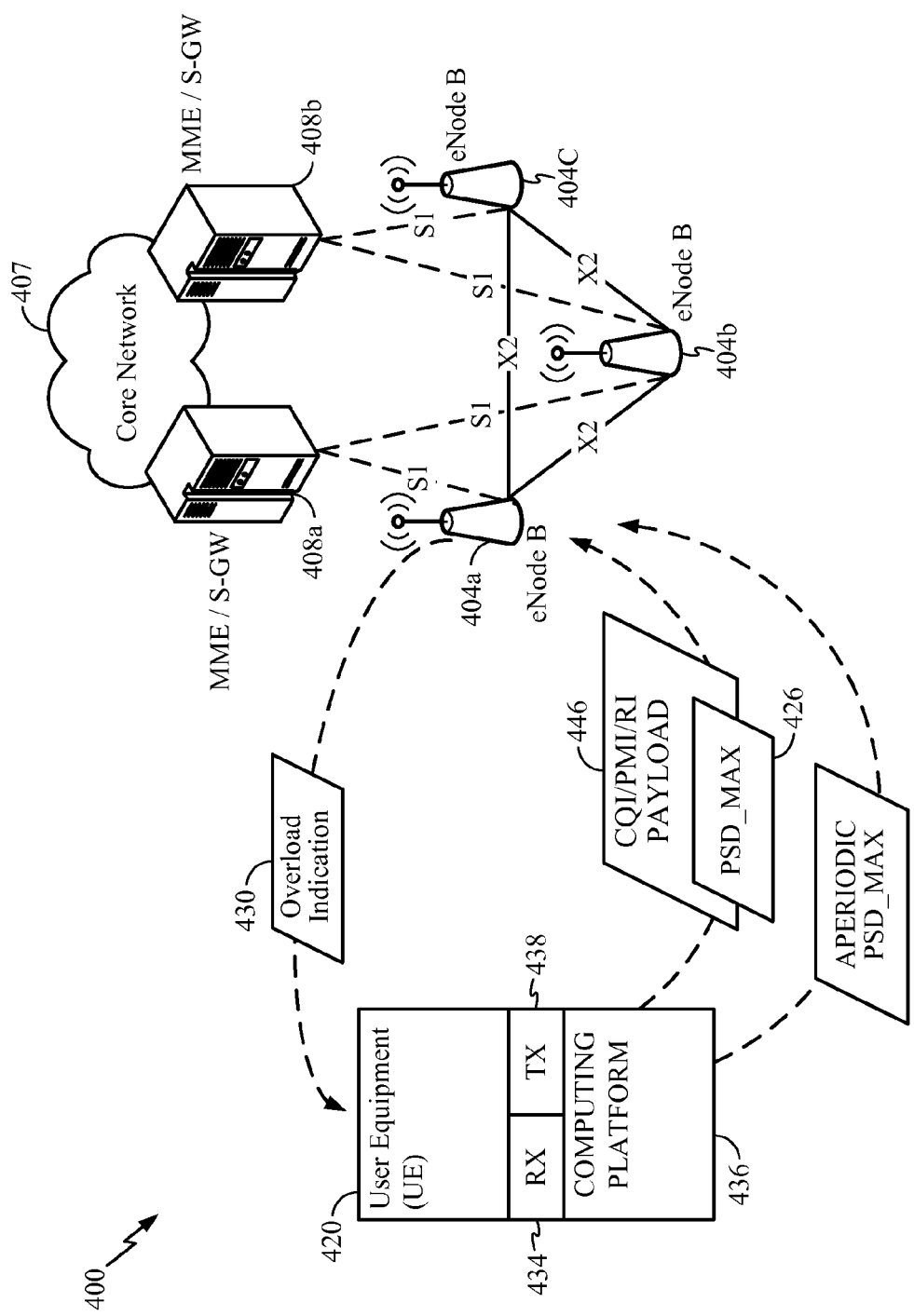
FIG. 4 illustrates a wireless communication system utilizing overload indicators for inter-cell interference coordination, in accordance with certain aspects of the present disclosure.

FIG. 4 illustrates a wireless communication system utilizing overload indicators for inter-cell interference coordination, in accordance with certain aspects of the present disclosure. As illustrated, the wireless communication system 400 comprises a few access points (i.e., eNBs) 404a-404c and a UE 420. The eNBs 404a-404c are interconnected with each other by means of an X2 interface. The eNBs 404a-404c are also connected by means of an S1 interface to an EPC (Evolved Packet Core) 407, more specifically to a Mobility Management Entity (MME) by means of a S1-MME interface and to a Serving Gateway (S-GW) by means of an S1 interface, collectively depicted at 408a-408b. The S1 interface supports many-to-many relationship between MMEs, Serving Gateways 408a-408b and eNBs 404a-404c.

The wireless communication system 400 performs Inter-Cell Interference Coordination (ICIC) by having an eNB (e.g., 404b, 404c) send interference Overload Indicators (OI) 430 Over-The-Air (OTA) for use by the UE 420. The UE 420, in turn, transmits a maximum Power Spectral Density (PSD_Max) report 426 to its serving access point 404a, which can coordinate via a backhaul network (e.g., X2 interface) to other access points (e.g., 404b).

In order to support ICIC procedure at the UE 420, the UE 420 may have a receiver 434 that receives the OIs 430. The UE may also have a computing platform 436 that processes the OIs 430, determines Power Spectral Density (PSD) values for each resource block (RB) per subband (i.e., one or more sub-carriers), selects a maximum of the PSD values (i.e., PSD_Max). The UE may also have a transmitter 438 that transmits the PSD_Max value 426 to the serving access point 404a.

For certain aspects, a UE may multiplex the PSD_Max value with other information that is reported to the serving access point for each subband. For example, as shown at 446, the UE may utilize a portion of the Channel Quality Indicator (CQI), Precoding Matrix Index (PMI), Rank Indicator (RI) or ACK/NACK message formats to transmit PSD_Max data 426 to the serving access point. In the LTE standard, Physical Uplink Control Channel (PUCCH) formats 2/2a/2b are used for reporting CQI/PMI/RI values. These formats may be reused for transmitting PSD_Max values periodically.

For certain aspects, the PSD_Max value may be multiplexed with the CQI/PMI/RI report or ACK/NACK messages in different ways. For example, a portion of CQI/PMI/RI payload may be used to report PSD_Max to the serving access point. Therefore, the serving access point may reserve a certain number of bits in the payload for PSD_Max reporting. For example, the serving AP may assign 3 bits of a CQI/PMI/RI payload to PSD_Max reporting. For certain aspects, number of bits assigned to the PSD_Max reporting may change for different transmissions.

Alternatively, the serving access point may configure the UE to send a fixed amount of payload in the PUCCH channel for formats 2/2a/2b. In different transmission, the PSD_Max may be reported on different number of bits, depending on the availability. For example, if 10 bits are assigned to the payload of a CQI/PMI/RI message, the PSD_Max may be reported on 5 bits of the payload in one transmission and 3 bits in another transmission. Therefore, payload partition for CQI/PMI/RI and a payload portion for PSD_Max may be either configurable or fixed.

For certain aspects, frequency of transmission (i.e., periodicity) of CQI/PMI/RI or ACK/NACK messages and transmission of PSD_Max values may be different. For example, at a given time, if there is no need to report a CQI/PMI/RI/

ACK value, the UE may only send the PSD_Max value using one of the reporting formats for the CQI/PMI/RI or ACK/NACK messages.

For certain aspects, a UE may transmit one or more PSD_Max values at any reporting instance and cycle through different subbands over time to report PSD_Max values for all the subbands. For certain aspects, the UE may transmit differential PSD_Max values for different subbands with respect to a reference subband.

For certain aspects, a UE may utilize a Medium Access Control (MAC) Packet Data Unit (MPDU) to send PSD_Max values aperiodically in the physical uplink shared channel (PUSCH). A UE may be configured to use either the PUCCH reporting method or a MPDU reporting method or both.

For certain aspects, a PSD_Max value may be transmitted with different resolutions in the PUCCH reporting mode or MPDU reporting mode. For example, an access point may configure the PUCCH report mode for transmissions of PSD_Max with a lower resolution compared to the MAC PDU report mode. A lower resolution may mean either using fewer number of bits for a similar subband size, or using similar number of bits for a larger subband size, resulting in smaller number of bits for reporting the full bandwidth.

For certain aspects, in a system where maximum and minimum power spectral densities for each RB are 23 dB and −70 dB, respectively, range of the PSD_Max may be 93 dB which may be reported by 6 or 7 bits. The PSD-Max value may also be reported with a better resolution at high-power region.

The PSD_Max may be reported with different formats such as absolute value reporting or multi-level reporting. In absolute value reporting, maximum power per RB in dBm may be reported using a fixed number of bits (e.g., 6 bits). In multi-level reporting, which is suitable for multiplexing with CQI on the PUCCH channel, 3 bits may be used for reporting index of the interfering cell which may be updated with a slow time scale (e.g., 200 ms). Also, 3-4 bits may be utilized for reporting path loss difference, which has a slow time scale (e.g., 200 ms). In addition, 3-4 bits may be used for reporting cumulative over-the-air interference correction which may have a fast time scale (e.g., 10 ms).

Number of subbands for which PSD_Max is reported may be configured by signaling in the radio resource control (RRC) layer by the serving cell. The RRC layer is responsible for broadcast, paging, RRC connection management, radio bearer management, UE measurement reporting and control, etc. Number of bits per subband and number of subbands for which overload indicator are received from neighboring cells may also be configured by the RRC signaling.

Figure 5:
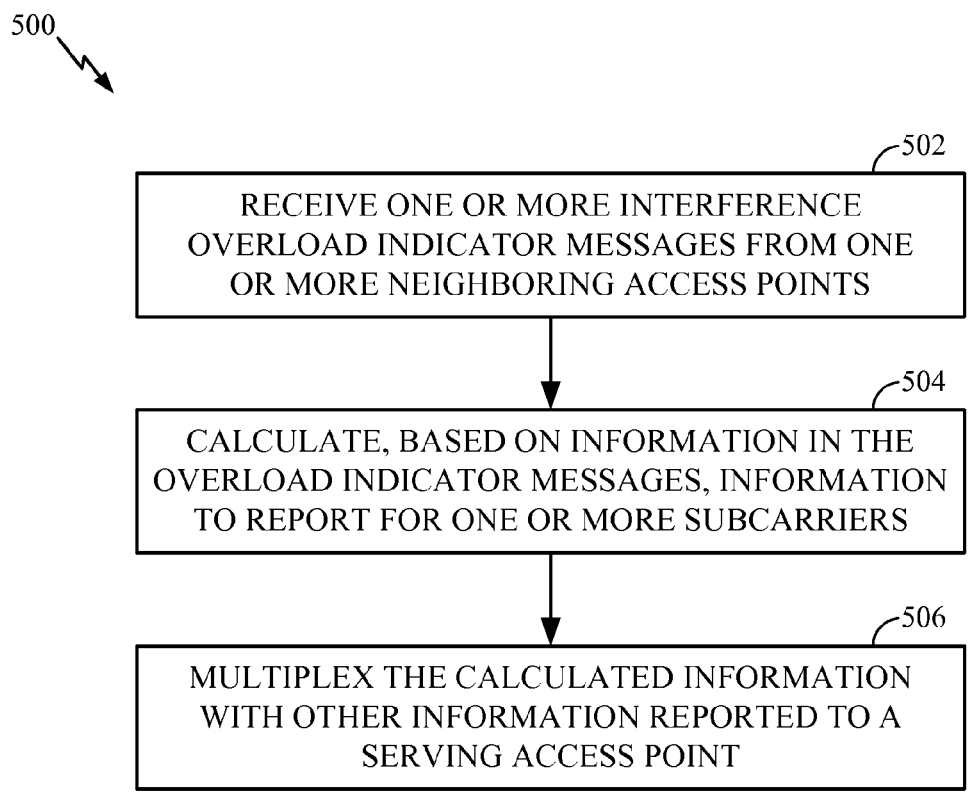
FIG. 5 illustrates example operations that may be performed by a user equipment to report information in response to overload indicators, in accordance with certain aspects of the present disclosure.

FIG. 5 illustrates example operations 500 that may be performed by a UE to report information in response to overload indicators, in accordance with certain aspects of the present disclosure. At 502, the UE receives one or more interference overload indicator messages from one or more neighboring access points. At 504, the UE calculates, based on information in the overload indicator messages, information to report for one or more subcarriers. For example, the UE may compute a maximum power spectral density value for each subband.

At 506, the UE multiplexes the calculated information with other information reported to a serving access point. For example, the UE may multiplex the PSD_Max with CQI/PMI/RI or ACK/NACK messages in PUCCH or may transmit the PSD_Max using a MAC-PDU.

Figure 6:
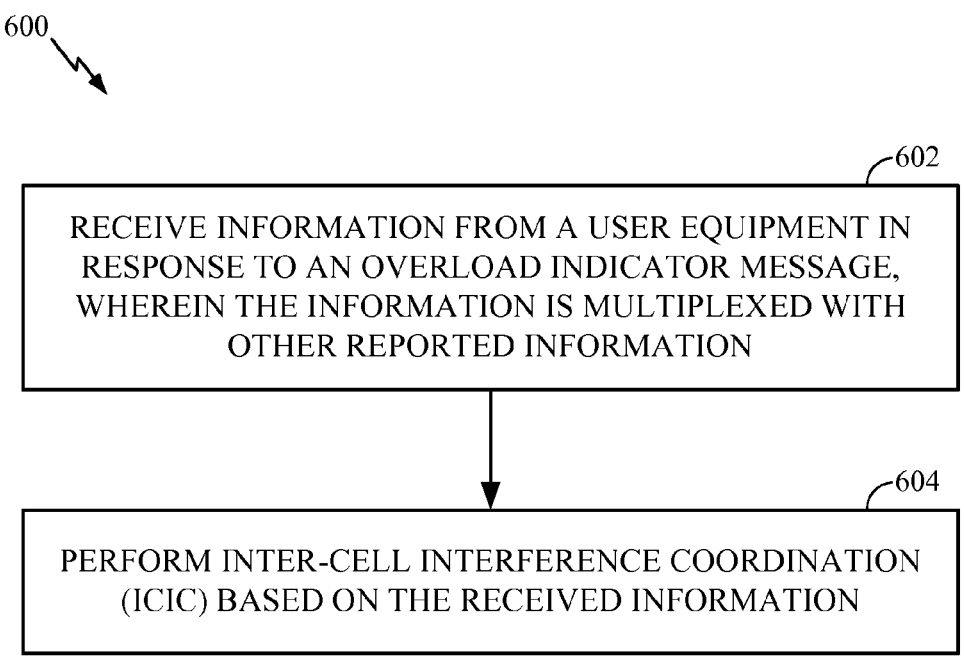
FIG. 6 illustrates example operations that may be performed by an access point to receive information in response to overload indicators, in accordance with certain aspects of the present disclosure.

FIG. 6 illustrates example operations 600 that may be performed by an access point to receive information in response to overload indicators, in accordance with certain aspects of the present disclosure. At 602, the access point receives information from a user equipment in response to an overload indicator message, wherein the information is multiplexed with other reported information. At 604, the access point performs inter-cell interference coordination (ICIC) based on the received information.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications, comprising:
receiving one or more interference overload indicator messages from one or more neighboring access points;
receiving, from a serving access point, an indication of a quantity of bits for a physical uplink control channel in which a maximum power spectral density is to be reported;
calculating, based on information in the overload indicator messages, information to report for one or more subcarriers, wherein the calculated information is a maximum power spectral density and wherein the maximum power spectral density is reported in one or more bits, indicated by the received indication of the quantity of bits, of the physical uplink control channel; and
multiplexing the calculated information with other information reported to the serving access point, wherein the other reported information comprises at least one of a channel quality indicator, a pre-coding matrix index, a rank indicator, an acknowledgment message, or a negative acknowledgment message for a downlink data channel.

2. The method of claim 1, wherein the maximum power spectral density is reported for a plurality of subcarriers.

3. The method of claim 2, wherein the maximum power spectral density is reported for different subcarriers in different instances of a physical uplink control channel.

4. The method of claim 1, wherein the quantity of bits is configurable by the serving access point.

5. The method of claim 1, wherein the multiplexing comprises:
transmitting the calculated information with a different periodicity than the other reported information.

6. The method of claim 1, wherein the multiplexing comprises:
multiplexing the calculated information with the other reported information in a single instance of a physical uplink control channel.

7. The method of claim 1, wherein the multiplexing comprises:
multiplexing the calculated information with the other reported information in one or more physical uplink control channels at a first resolution; and
transmitting the calculated information in one or more medium access control protocol data units at a second resolution.

8. A method for wireless communications, comprising:
transmitting, to a user equipment, an indication of a quantity of bits of the physical uplink control channel in which a maximum power spectral density is to be reported;
receiving information from the user equipment in response to an overload indicator message, wherein the information is multiplexed with other reported information, wherein the other reported information comprises at least one of a channel quality indicator, a pre-coding matrix index, a rank indicator, an acknowledgment message, or a negative acknowledgment message for a downlink data channel, and wherein the received information is a maximum power spectral density, wherein the maximum power spectral density is reported in one or more bits, indicated by the transmitted indication of the quantity of bits, of the physical uplink control channel; and
performing inter-cell interference coordination based on the received information.

9. The method of claim 8, further comprising:
transmitting one or more interference overload indicator messages to one or more user equipments that are served by neighboring access points.

10. The method of claim 8, wherein the maximum power spectral density is received for a plurality of subcarriers.

11. The method of claim 10, wherein the maximum power spectral density is received for different subcarriers in different instances of a physical uplink control channel.

12. The method of claim 8, wherein the quantity of bits is configurable by a serving access point.

13. The method of claim 8, wherein the information is received with a different periodicity than the other reported information.

14. The method of claim 8, wherein the information and the other reported information are received in a single instance of a physical uplink control channel.

15. The method of claim 8, wherein the receiving comprises:
receiving the information from the user equipment in one or more physical uplink control channels at a first resolution; and
receiving the information from the user equipment in one or more medium access control protocol data units at a second resolution.

16. An apparatus for wireless communications, comprising:
one or more processors configured to:
receive one or more interference overload indicator messages from one or more neighboring access points;
receive, from a serving access point, an indication of a quantity of bits for a physical uplink control channel in which a maximum power spectral density is to be reported;
calculate, based on information in the overload indicator messages, information to report for one or more subcarriers, wherein the calculated information is a maximum power spectral density and wherein the maximum power spectral density is reported in one or more bits, indicated by the received indication of the quantity of bits, of the physical uplink control channel; and multiplex the calculated information with other information reported to the serving access point, wherein the other reported information comprises at least one of a channel quality indicator, a pre-coding matrix index, a rank indicator, an acknowledgment message, or a negative acknowledgment message for a downlink data channel; and a memory coupled to the one or more processors.

17. The apparatus of claim 16, wherein the maximum power spectral density is reported for a plurality of subcarriers.

18. The apparatus of claim 17, wherein the maximum power spectral density is reported for different subcarriers in different instances of a physical uplink control channel.

19. The apparatus of claim 16, wherein the quantity of the bits is configurable by the serving access point.

20. The apparatus of claim 16, wherein the one or more processors are further configured to:
transmit the calculated information with a different periodicity than the other reported information.

21. The apparatus of claim 16, wherein the one or more processors are further configured to:
multiplex the calculated information with the other reported information in a single instance of a physical uplink control channel.

22. The apparatus of claim 16, wherein the one or more processors are further configured to:
multiplex the calculated information with the other reported information in one or more physical uplink control channels at a first resolution; and
transmit the calculated information in one or more medium access control protocol data units at a second resolution.

23. An apparatus for wireless communications, comprising:
one or more processors configured to:
transmit, to a user equipment, an indication of a quantity of bits of a physical uplink control channel in which a maximum power spectral density is to be reported;
receive information from the user equipment in response to an overload indicator message, wherein the information is multiplexed with other reported information, wherein the other reported information comprises at least one of a channel quality indicator, a pre-coding matrix index, a rank indicator, an acknowledgment message, or a negative acknowledgment message for a downlink data channel, wherein the received information is a maximum power spectral density and wherein the maximum power spectral density is reported in one or more bits, indicated by the transmitted indication of the quantity of bits, of the physical uplink control channel; and
perform inter-cell interference coordination based on the received information; and
a memory coupled to the one or more processors.

24. The apparatus of claim 23, wherein the one or more processors are further configured to:
transmit one or more interference overload indicator messages to one or more user equipments that are served by neighboring access points.

25. The apparatus of claim 23, wherein the maximum power spectral density is received for a plurality of subcarriers.

26. The apparatus of claim 25, wherein the maximum power spectral density is received for different subcarriers in different instances of a physical uplink control channel.

27. The apparatus of claim 23, wherein the processor is further configured to configure the quantity of bits.

28. The apparatus of claim 23, wherein the information is received with a different periodicity than the other reported information.

29. The apparatus of claim 23, wherein the information and the other reported information are received in a single instance of a physical uplink control channel.

30. The apparatus of claim 23, wherein the one or more processors are further configured to:
receive the information in one or more physical uplink control channels at a first resolution; and
receive the information in one or more medium access control protocol data units at a second resolution.

31. An apparatus for wireless communications, comprising:
means for receiving one or more interference overload indicator messages from one or more neighboring access points;
means for receiving, from a serving access point, an indication of a quantity of bits for a physical uplink control channel in which a maximum power spectral density is to be reported;
means for calculating, based on information in the overload indicator messages, information to report for one or more subcarriers, wherein the calculated information is a maximum power spectral density and wherein the maximum power spectral density is reported in one or more bits, indicated by the received indication of the quantity of bits, of the physical uplink control channel; and
means for multiplexing the calculated information with other information reported to the serving access point, wherein the other reported information comprises at least one of a channel quality indicator, a pre-coding matrix index, a rank indicator, an acknowledgment message, or a negative acknowledgment message for a downlink data channel.

32. The apparatus of claim 31, wherein the maximum power spectral density is reported for a plurality of subcarriers.

33. The apparatus of claim 32, wherein the maximum power spectral density is reported for different subcarriers in different instances of a physical uplink control channel.

34. The apparatus of claim 31, wherein the quantity of the bits is configurable by the serving access point.

35. The apparatus of claim 31, further comprising means for transmitting the calculated information with a different periodicity than the other reported information.

36. The apparatus of claim 31, further comprising means for multiplexing the calculated information with the other reported information in a single instance of a physical uplink control channel.

37. The apparatus of claim 31, further comprising:
means for multiplexing the calculated information with the other reported information in one or more physical uplink control channels at a first resolution; and
means for transmitting the calculated information in one or more medium access control protocol data units at a second resolution.

38. An apparatus for wireless communications, comprising:
means for transmitting, to a user equipment, an indication of a quantity of bits of the physical uplink control channel in which a maximum power spectral density is to be reported;

means for receiving information from the user equipment in response to an overload indicator message, wherein the information is multiplexed with other reported information, wherein the other reported information comprises at least one of a channel quality indicator, a pre-coding matrix index, a rank indicator, an acknowledgment message, or a negative acknowledgment message for a downlink data channel, and wherein the received information is a maximum power spectral density, wherein the maximum power spectral density is reported in one or more bits, indicated by the transmitted indication of the quantity of bits, of the physical uplink control channel; and means for performing inter-cell interference coordination based on the received information.

39. The apparatus of claim 38, further comprising means for transmitting one or more interference overload indicator messages to one or more user equipments that are served by neighboring access points.

40. The apparatus of claim 38, wherein the maximum power spectral density is received for a plurality of subcarriers.

41. The apparatus of claim 40, wherein the maximum power spectral density is received for different subcarriers in different instances of a physical uplink control channel.

42. The apparatus of claim 38, wherein the quantity of bits is configurable by the apparatus.

43. The apparatus of claim 38, wherein the information is received with a different periodicity than the other reported information.

44. The apparatus of claim 38, wherein the information and the other reported information are received in a single instance of a physical uplink control channel.

45. The apparatus of claim 38, further comprising:
means for receiving the information in one or more physical uplink control channels at a first resolution; and
means for receiving the information in one or more medium access control protocol data units at a second resolution.

46. A computer-program product for wireless communications, comprising a non-transitory computer readable medium having instructions stored thereon, the instructions being executable by one or more processors and the instructions comprising:
instructions for receiving one or more interference overload indicator messages from one or more neighboring access points;
instructions for receiving, from a serving access point, an indication of a quantity of bits for a physical uplink control channel in which a maximum power spectral density is to be reported;
instructions for calculating, based on information in the overload indicator messages, information to report for one or more subcarriers, wherein the calculated information is a maximum power spectral density and wherein the maximum power spectral density is reported in one or more bits, indicated by the received indication of the quantity of bits, of the physical uplink control channel; and
instructions for multiplexing the calculated information with other information reported to the serving access point, wherein the other information comprises at least one of a channel quality indicator, a pre-coding matrix index, a rank indicator, an acknowledgment message, or a negative acknowledgment message for a downlink data channel.

47. A computer-program product for wireless communications, comprising a non-transitory computer readable medium having instructions stored thereon, the instructions being executable by one or more processors and the instructions comprising:
instructions for transmitting, to a user equipment, an indication of a quantity of the bits of the physical uplink control channel in which a maximum power spectral density is to be reported;
instructions for receiving information from a user equipment in response to an overload indicator message, wherein the information is multiplexed with other reported information, wherein the other reported information comprises at least one of a channel quality indicator, a pre-coding matrix index, a rank indicator, an acknowledgment message, or a negative acknowledgment message for downlink data channel, and wherein the received information is a maximum power spectral density, wherein the maximum power spectral density is reported in one or more bits, indicated by the transmitted indication of the quantity of bits, of the physical uplink control channel; and
instructions for performing inter-cell interference coordination based on the received information.

* * * * *